United States Patent
Baramov

(10) Patent No.: US 11,788,461 B2
(45) Date of Patent: Oct. 17, 2023

(54) TURBOCHARGER CONTROL WITH OVERSPEED PROTECTION

(71) Applicant: Garrett Transportation I Inc., Torrance, CA (US)

(72) Inventor: Lubomir Baramov, Prague (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/392,951

(22) Filed: Aug. 3, 2021

(65) Prior Publication Data

US 2023/0038827 A1 Feb. 9, 2023

(51) Int. Cl.
*F02B 37/24* (2006.01)
*F02B 37/18* (2006.01)
*F02B 37/12* (2006.01)

(52) U.S. Cl.
CPC ............... *F02B 37/24* (2013.01); *F02B 37/18* (2013.01); *F02B 2037/122* (2013.01)

(58) Field of Classification Search
CPC ..... F02B 37/24; F02B 37/18; F02B 2037/122
See application file for complete search history.

(56) References Cited

U.S. PATENT DOCUMENTS

| | | | |
|---|---|---|---|
| 5,083,434 A | 1/1992 | Dahlgren et al. | |
| 5,906,098 A | 5/1999 | Woolenweber et al. | |
| 6,637,205 B1 | 10/2003 | Ahmad et al. | |
| 6,705,084 B2 | 3/2004 | Allen et al. | |
| 7,047,740 B2 | 5/2006 | Fukasawa et al. | |
| 7,127,892 B2 | 10/2006 | Akins et al. | |
| 7,805,939 B2 | 10/2010 | Kimoto et al. | |
| 7,905,091 B2 | 3/2011 | Kassner | |
| 10,132,234 B2 | 11/2018 | Kim | |
| 10,422,289 B2 | 9/2019 | Xiao et al. | |
| 2006/0005540 A1* | 1/2006 | Baize | F02D 23/00 60/602 |
| 2008/0276614 A1* | 11/2008 | Shu | F02D 41/1448 60/602 |
| 2009/0000298 A1 | 1/2009 | Barthelet | |
| 2010/0050630 A1 | 3/2010 | Luken et al. | |

(Continued)

FOREIGN PATENT DOCUMENTS

CN 10732742 A 11/2017
DE 102016222577 A1 7/2017

(Continued)

OTHER PUBLICATIONS

Eriksson, "Modeling and Control of Turbocharged SI and DI Engines," Oil and Gas Technology, vol. 62, No. 4, pp. 523-538, 2007.

(Continued)

*Primary Examiner* — Hoang M Nguyen
(74) *Attorney, Agent, or Firm* — Seager, Tufte & Wickhem, LLP

(57) ABSTRACT

Systems and methods for controlling turbocharger operation by maintaining a virtual turbocharger speed calculation using airflow parameters in the context of an engine. An example uses a turbocharger speed estimator, an energy observer, and an energy controller. Optimization of turbocharger speed control, including avoidance of overspeed, while reducing wastegate actuation, can be achieved using a predictive control algorithm.

20 Claims, 13 Drawing Sheets

(56) References Cited

U.S. PATENT DOCUMENTS

| | | |
|---|---|---|
| 2011/0041493 A1 | 2/2011 | Allen et al. |
| 2013/0042609 A1* | 2/2013 | Cianflone ............... F02B 37/18 |
| | | 73/114.77 |
| 2019/0226390 A1 | 7/2019 | McConville et al. |
| 2019/0226391 A1 | 7/2019 | Buckland et al. |
| 2021/0355842 A1* | 11/2021 | Mueller .................. F02B 37/12 |

FOREIGN PATENT DOCUMENTS

| | | | | |
|---|---|---|---|---|
| DE | 102020205991 A1 * | 11/2021 | ............ | F01D 17/16 |
| JP | H09195782 A | 7/1997 | | |
| JP | 2016205301 A | 12/2016 | | |

OTHER PUBLICATIONS

Herceg, M, et al., "Boost Pressure Control for Electrically Assisted Turbochargers," U.S. Appl. No. 17/122,240, filed Dec. 15, 2020, 35 pages.

Extended European Search Report for EP Application No. 22173204.3 dated Dec. 15, 2022, 13 pages.

* cited by examiner

TURBOCHARGER CONTROL WITH OVERSPEED PROTECTION

BACKGROUND

Turbochargers compress air entering the engine intake manifold by using a turbine in the engine exhaust air flow to power a compressor in the intake air flow. Typical control over such systems includes monitoring boost pressure provided by the compressor and adjusting an actuator that controls turbocharger speed to maintain desired boost pressure setpoint. The actuator may control position of, for example, a wastegate, which when open allows exhaust air flow to bypass the turbine thus affecting the power delivered to the turbine. Some turbochargers use, in addition to or instead of a wastegate, a variable geometry turbine and/or a variable inlet compressor to add control over the turbocharger.

A hypothetical control method may, for example, monitor a feedback signal, such as the measured or calculated boost pressure at the compressor outlet, and adjust the wastegate position to maintain a target boost pressure. The hypothetical control method would decrease opening of the wastegate to increase boost pressure if it is below a setpoint, and would increase opening of the wastegate to decrease boost pressure if it is above a setpoint. However, there are several factors that make a basic control loop suboptimal. Demand conditions on the system change quickly, and the air flow is turbulent, causing sensed parameters, including pressure, to be prone to spiking and inaccuracy. The system can be subject to significant lag between the change of wastegate opening command and a change in actuator positioning and subsequent change in boost pressure. Moreover, the response of the boost pressure to turbocharger actuator movement is highly sensitive to current engine operating conditions. The whole air engine path system affects turbocharger control in a complex non-linear way. Turbocharger speed is also constrained by the physical limitations of the turbocharger because overspeed can cause catastrophic failure. Sudden changes in turbocharger speed such as by application of a physical governor to reduce turbocharger speed can lead to low cycle fatigue. The wastegate is subject to wear, operating in a harsh environment handling engine exhaust gas at elevated pressure and temperature; excess movement of the wastegate, whether due to fine adjustments or gross movements, can prematurely age the wastegate.

For any of these reasons, the hypothetical, simple control method may be inadequate. New and alternative systems and methods for controlling turbocharger speed, managing wastegate operation, and maintaining target boost pressure are desired.

OVERVIEW

The present inventors have recognized, among other things, that a problem to be solved is the need for new and/or alternative systems and methods for controlling turbocharger speed, managing wastegate operation, and maintaining target boost pressure are desired. In some illustrative examples, a virtual turbocharger speed "sensor" (VRTSS) is provided by modeling engine airflow and calculating turbocharger speed. The VRTSS may operate without directly measuring the turbocharger speed. The VRTSS can then be used in a control model to calculate changes to wastegate position within a time horizon to optimize control over boost pressure, wastegate position and turbocharger speed. Calculation of existing state and plotting of control signals within a relevant time horizon can be simplified by using a kinetic energy model.

An illustrative and non-limiting example takes the form of an engine system comprising: an engine having an intake manifold and an exhaust manifold; a turbocharger having a compressor and a turbine, the compressor being upstream of the intake manifold, the turbine being downstream of the exhaust manifold, wherein the turbocharger is configured obtain power from airflow exiting the exhaust manifold to drive the compressor to compress air to be provided to the intake manifold; a wastegate positioned and configured to allow airflow exiting the exhaust manifold to bypass the turbine, the wastegate selectively controllable in a range of opening positions between open and closed; a plurality of engine airpath sensors associated with the engine; and a controller configured to perform the following: estimate turbocharger speed using the engine airpath sensors and a model of the engine air path; calculate a target turbocharger speed by reference to a target boost pressure; and control the wastegate to minimize the distance between the target boost pressure and an actual boost pressure, while preventing turbocharger speed from exceeding a predefined maximum speed.

Additionally or alternatively, the engine airpath sensors comprise: a boost pressure sensor configured and positioned to measure the actual boost pressure; an IM pressure sensor and an IM temperature sensor at the intake manifold configured to sense intake manifold pressure and temperature; and wherein the controller is configured such that the engine airpath sensors used to estimate turbocharger speed include the boost pressure sensor, the IM pressure sensor and IM temperature sensor.

Additionally or alternatively, the controller is further configured to predict future turbocharger speed and calculate commands to the wastegate to avoid overspeed of the turbocharger.

Additionally or alternatively, the controller is further configured to estimate turbocharger speed using a compressor model, predict future turbocharger speed and calculate commands to the wastegate to minimize a future difference between actual boost pressure and target boost pressure while avoiding overspeed of the turbocharger.

Additionally or alternatively, the controller is configured to estimate turbocharger speed using a compressor model, a measured actual boost pressure, and each of an estimated compressor mass flow, estimated compressor inlet pressure and estimated compressor inlet temperature.

Additionally or alternatively, the controller is configured to perform the step of using the estimated turbocharger speed to issue commands to the wastegate to achieve a target boost pressure by: calculating a target turbocharger speed using the target boost pressure; calculating current compressor power; determining a target acceleration power needed to achieve the target turbocharger speed relative to the estimated turbocharger speed; determining turbine power needed to achieve the target acceleration power using the current compressor power; and determining a wastegate position needed to modify turbine flow to achieve the turbine power.

Additionally or alternatively, the controller comprises an upper level controller configured to predict future turbocharger speed within a time horizon, and to calculate feasible future turbocharger energy targets that prevent turbocharger speed exceeding a maximum speed limit, and a low level controller configured to control wastegate position in accordance with turbocharger energy targets computed by the upper level controller.

Another illustrative, non-limiting example takes the form of an engine system comprising: an engine having an intake manifold and an exhaust manifold; a turbocharger having a compressor and a turbine, the compressor being upstream of the intake manifold, the turbine being downstream of the exhaust manifold, wherein the turbocharger is configured obtain power from airflow exiting the exhaust manifold to drive the compressor to compress air to be provided to the intake manifold, the turbine taking the form of a variable nozzle turbine (VNT) selectively controllable in a range of opening positions between open and closed; a plurality of engine airpath sensors associated with the engine; and a controller configured to perform the following: estimate turbocharger speed using the engine airpath sensors and a model of the engine air path; calculate a target turbocharger speed by reference to a target boost pressure; and control the VNT to minimize the distance between the target boost pressure and an actual boost pressure, while preventing turbocharger speed from exceeding a predefined maximum speed.

Additionally or alternatively, the engine airpath sensors comprise: a boost pressure sensor configured and positioned to measure the actual boost pressure; an IM pressure sensor and an IM temperature sensor at the intake manifold configured to sense intake manifold pressure and temperature; and wherein the controller is configured such that the engine airpath sensors used to estimate turbocharger speed include the boost pressure sensor, the IM pressure sensor and IM temperature sensor.

Additionally or alternatively, the controller is further configured to predict future turbocharger speed and calculate commands to the VNT to avoid overspeed of the turbocharger.

Additionally or alternatively, the controller is further configured to estimate turbocharger speed using a compressor model, predict future turbocharger speed and calculate commands to the VNT to minimize a future difference between actual boost pressure and target boost pressure while avoiding overspeed of the turbocharger.

Additionally or alternatively, the controller is configured to estimate turbocharger speed using a compressor model, a measured actual boost pressure, and each of an estimated compressor mass flow, estimated compressor inlet pressure and estimated compressor inlet temperature.

Additionally or alternatively, the controller is configured to perform the step of using the estimated turbocharger speed to issue commands to the VNT to achieve a target boost pressure by: calculating a target turbocharger speed using the target boost pressure; calculating current compressor power; determining a target acceleration power needed to achieve the target turbocharger speed relative to the estimated turbocharger speed; determining turbine power needed to achieve the target acceleration power using the calculated current compressor power; and determining a VNT position needed to achieve the turbine power.

Additionally or alternatively, the controller comprises an upper level controller configured to predict future turbocharger speed within a time horizon, and to calculate feasible future turbocharger energy targets that prevent turbocharger speed exceeding a maximum speed limit, and a low level controller configured to control VNT position in accordance with turbocharger energy targets computed by the upper level controller.

Another illustrative, non-limiting example takes the form of a method of controlling a turbocharger in an engine system comprising: an engine having an intake manifold and an exhaust manifold; a turbocharger having a compressor and a turbine, the compressor being upstream of the intake manifold, the turbine being downstream of the exhaust manifold, wherein the turbocharger is configured obtain power from airflow exiting the exhaust manifold to drive the compressor to compress air to be provided to the intake manifold, the turbocharger having a turbine in the form of a variable nozzle turbine (VNT) selectively controllable in a range of opening positions between open and closed; a plurality of engine airpath sensors associated with the engine and turbocharger; and a controller configured to obtain signals from the engine airpath sensors and control at least the VNT, the method comprising: the controller estimating turbocharger speed using the engine airpath sensors and a model of the engine air path; the controller calculating a target turbocharger speed by reference to a target boost pressure; and the controller issuing command signals to control the VNT to minimize the distance between the target boost pressure and an actual boost pressure, while preventing turbocharger speed from exceeding a predefined maximum speed.

Additionally or alternatively, the engine airpath sensors comprise: a boost pressure sensor configured and positioned to measure the actual boost pressure; and an IM pressure sensor and an IM temperature sensor at the intake manifold configured to sense intake manifold pressure and temperature; wherein the step of estimating turbocharger speed includes taking sensor readings from the boost pressure sensor, the IM pressure sensor, and the IM temperature sensor.

Additionally or alternatively, the method further comprises the controller predicting future turbocharger speed; and the controller calculating commands to the VNT to avoid overspeed of the turbocharger.

Additionally or alternatively, the method further comprises the controller predicting future turbocharger speed; and the controller calculating commands to the VNT to minimize a future difference between actual boost pressure and target boost pressure while avoiding overspeed of the turbocharger Additionally or alternatively, the step of using the estimated turbocharger speed to issue commands to the VNT to achieve a target boost pressure comprises: calculating a target turbocharger speed using the target boost pressure; determining a target acceleration power needed to achieve the target turbocharger speed relative to the estimated turbocharger speed; determining turbine power needed to achieve the target acceleration power; and determining a VNT position needed to achieve the determined turbine power.

Yet another illustrative and non-limiting example takes the form of a method of controlling a turbocharger in an engine system comprising: an engine having an intake manifold and an exhaust manifold; a turbocharger having a compressor and a turbine, the compressor being upstream of the intake manifold, the turbine being downstream of the exhaust manifold, wherein the turbocharger is configured obtain power from airflow exiting the exhaust manifold to drive the compressor to compress air to be provided to the intake manifold; a wastegate (WG) positioned to allow exhaust gasses exiting the exhaust manifold to selectively bypass the turbine; a plurality of engine airpath sensors associated with the engine and turbocharger; and a controller configured to obtain signals from the engine airpath sensors and control at least the WG, the method comprising: the controller estimating turbocharger speed using the engine airpath sensors and a model of the engine air path; the controller calculating a target turbocharger speed by reference to a target boost pressure; and the controller issuing command signals to control the WG to minimize the distance between the target boost pressure and an actual boost pressure, while preventing turbocharger speed from exceeding a predefined maximum speed.

Additionally or alternatively, the engine airpath sensors comprise: a boost pressure sensor configured and positioned to measure the actual boost pressure; an IM pressure sensor and an IM temperature sensor at the intake manifold configured to sense intake manifold pressure and temperature; wherein the step of estimating turbocharger speed includes taking sensor readings from the boost pressure sensor, the IM pressure sensor, and the IM temperature sensor.

Additionally or alternatively, the method further comprises the controller predicting future turbocharger speed; and the controller calculating commands to the WG to avoid overspeed of the turbocharger.

Additionally or alternatively, the method further comprises the controller predicting future turbocharger speed; and the controller calculating commands to the WG to minimize a future difference between actual boost pressure and target boost pressure while avoiding overspeed of the turbocharger.

Additionally or alternatively, the step of using the estimated turbocharger speed to issue commands to the WG to achieve a target boost pressure comprises: calculating a target turbocharger speed using the target boost pressure; determining a target acceleration power needed to achieve the target turbocharger speed relative to the estimated turbocharger speed; determining turbine power needed to achieve the target acceleration power; and determining a WG position needed to achieve the determined turbine power.

This overview is intended to introduce the subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
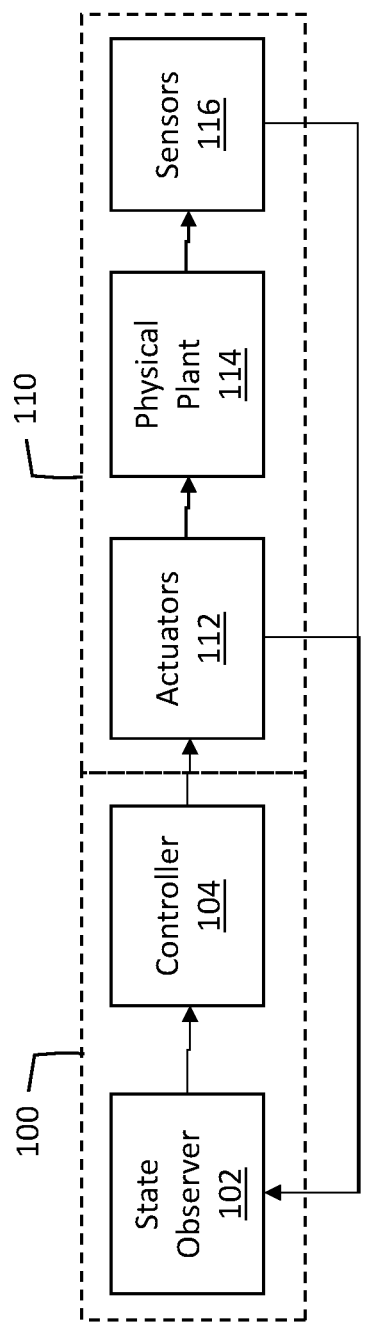
FIG. 1 shows a model of an operational control system.

FIG. 1 shows a model of a control system. A control apparatus is shown at 100 for controlling a system 110. The control apparatus includes a state observer 102, which feeds a set of current state variables to a controller 104. The controller 104 calculates a solution for process parameters that can be applied to the system 110.

The system 110 includes a set of actuators 112, which in turn control operation of the physical plant 114. The physical plant 114 may be, for example and without limitation, an internal combustion engine, whether diesel, gasoline or other fuel. The set of actuators 112 may control, for example and without limitation, fuel or other injectors, variable nozzle turbine position, engine brake, after-treatment (including exhaust), throttle position, exhaust gas recirculation (EGR) valve, an electric motor (in an electric turbocharger for example), waste gate (WG) position, charge air cooler (CAC) functions, position of a recirculation valve (RCV), position of a variable compressor geometry actuator; and other valves, nozzles, and components in the system 110.

A plurality of sensors 116 are provided. Sensors 116 may include, for example, and without limitation, sensors detecting manifold absolute pressure (MAP), mass air flow (MAF), EGR pressure, pressure difference across the EGR valve, flow and temperature, turbo speed, oxygen fraction in exhaust gas (sometimes referred to as a lambda sensor in the art), NOx, engine speed, fuel quantity, boost pressure, etc. Which sensors are used in a given installation may vary depending on which actuators are present and other design choices including the type of fuel to combust (diesel, gasoline or other). Additional monitored parameters may include, for example, WG position and/or normalized opening, RCV position and/or normalized opening, and/or variable geometry compressor position and configuration. Sensors 116 may in some examples also sense user inputs, such as the pressure on acceleration pedal (and changes to such). Sensors 116 may be configured to sample the underlying parameter being sensed and provide the result of such samples to the state observer 102. The state observer 102 may record the sensor outputs and actuator positions over time to provide history of the system operation and uses the reported parameter to calculate the current state. As outlined further below, the state observer 102 may use modelling to track a range of non-measured parameters within the physical plant 114 in addition to the reported measured parameters, as well as to reduce effects of measurement noise. Controller 104 receive the current state from the state observer 102, and may also receive data directly from sensors, as well as data or commands from other software components in the system responsible for engine management.

The state observer 102 and controller 104 may be, for example, implemented in a microcontroller configured to operate on a set of stored instructions for performing a state observation and optimization routine. In another example, an application specific integrated circuit (ASIC) may provide state observer functions, which can include the capture or accumulation of data from the actuators 112 and/or sensors 116, which in turn may be read periodically by a microcontroller. The controller 104 may be configured with circuitry, logic, and/or stored instruction sets for performing a control and/or optimization calculation using, for example, model predictive control (MPC) cost functions, linear quadratic regulator (LQR) control, proportional integral derivative (PID) control, or other control methods.

The state observer 102 and/or controller 104 may be integrated into, or provided separately from, an on-board diagnostics system (not shown) that can be used to record diagnostic variables and present them, as needed to the user or to store for later analysis. Separate blocks 102 and 104 are shown, however, it should be understood that this architecture may be integrated into a single processor or microcontroller, if desired. Additional blocks may be defined for some designs including for example a health monitor or environmental control monitor. In other examples, separate ASIC, state machine(s), microcontroller(s) or microprocessors may be provided for each block 102 and 104, as desired. The various blocks shown may be operatively connected by electrical and/or communications couplings, including for example a controller area network bus.

The control solution calculated by the controller 104 is used to generate one or more outputs, which in turn are used to control the actuators 112 to operate the physical plant 114. Generally speaking the aim may be to minimize the distance of operating variables from one or more target output values for the controllable outputs or physical plant operating characteristics. For example, the targets may be any of target turbocharger speed, target boost pressure, target pressure difference over the compressor, target air mass flow, target gas compositions, or a combination thereof. With MPC functions, the distance to target or reference values for the one or more output values (or resulting operating characteristics) is minimized, thus optimizing performance. As an example, an MPC cost function formation may be as shown in Equation 1:

$$J_{MPC} = \min \Sigma_{k=1}^{P} \|y_{r,k} - y_k\|_{w_1} + \|u_{d,k} - u_k\|_{w_2} \quad [\text{Eq. 1}]$$

Where $u_{d,k}$ corresponds to the desired profile for the manipulated variable, $u_k$ stands for the manipulated variable, k denotes discrete time instance, and P stands for the prediction horizon of the predictive controller. In this example, $y_{r,k}$ and $y_k$ represent the output reference and measured value, respectively, and $W_1$ and $W_2$ specify weighting terms. The MPC cost function is minimized in operation in order to provide optimal control to the physical plant, and the controller 104 may use MPC accordingly.

In another example, a PID control method can be used to account for each of proportional, integral, and derivative differences from a target operating point. A target operating point for PID control may use a single value, such as compressor boost pressure, or may use a plurality of values such as compressor speed and compressor boost pressure, while controlling other factors (actuator positions, for example) to direct operations to maintain such target(s). The proportional difference may indicate current state, integral difference may identify a process shift over time, and derivative difference may indicate the direction of changes in operation. With PID control, a proportional difference is minimized while monitoring to ensure that the integral and derivative differences do not indicate changing performance which may, after further iterations, cause the proportional difference to increase. The control parameters output to the actuators 112 are, for a PID controller, adjusted to reduce or minimize the distance of actual performance from one or more targets on an iterative basis. PID control may incorporate multiple different target operating characteristics. The controller 104 may use PID control instead of MPC, for example. LQR control may be used instead, if desired, applying similar concepts. Multiple controllers 104 may be cascaded in a more complex structure, if desired, such as by having a cascade of several simplified controllers to break up the type of larger, non-linear problems presented by the applied control methodology into manageable pieces.

Figure 2:
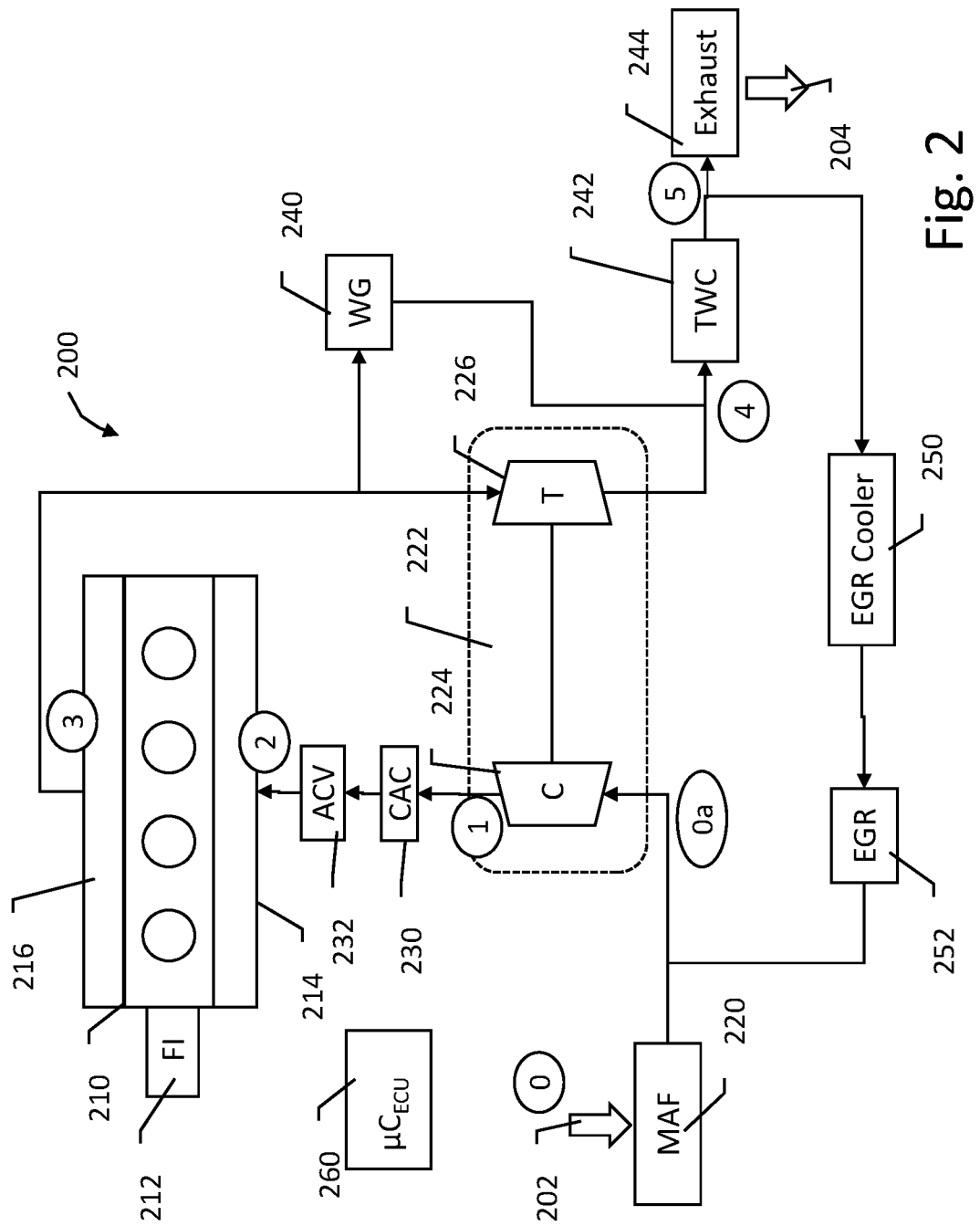
FIG. 2 shows an illustrative engine in schematic form.

The state observer 102 and/or controller 104 may rely on an engine air path model that accounts for the different features of the engine (such as shown in FIG. 2, below) to estimate physical variables such as temperatures and pressures at various locations in the engine. To facilitate the above-mentioned control methods (PID, MPC and/or LQR), estimated pressures and temperatures can be inferred and tracked over time, as well as projected into the future within a defined time horizon, using models that are developed and validated typically under well controlled conditions such as at a test station. Specific models will vary with specific engine builds, and the terminology may vary by manufacturer. However, generally speaking, the values for estimated physical variables are available for use in the illustrative methods discussed below. As used herein, a "system monitor" is whichever of the state observer 102, or controller 104 (or a separate controller, if provided) that tracks and models such inferred values.

FIG. 2 shows an illustrative engine in schematic form. The system 200 includes an engine 210 having an (air) intake manifold 214, and exhaust manifold 216 and a plurality of cylinders. The engine cylinders receive fuel input by fuel injectors 212. Each fuel injector 216 is adapted to provide a variable charge of fuel for each cycle of the cylinder (generally). The amount of fuel injected is determined by a control signal.

The air system of the engine system 200 is shown in some detail. Ambient air 202 is received and filtered to remove particulates by an air filter (not shown), which is followed by a mass air flow (MAF) sensor 220. The MAF sensor 220 determines a mass flow entering the system. The MAF sensor 220 may be optional, as noted below.

As used herein, when air passes through an element, the position before the air passes through the element is referred to as "upstream," and the position after the air passes through the element is referred to as "downstream." For example, as shown, air passes through the MAF sensor 220 and then goes to the compressor 224 of turbocharger 222, therefore the compressor 224 is downstream of the MAF sensor 222, and the MAF sensor 222 is upstream of the compressor 224. Ambient air conditions may be sensed as indicated at position 0 with pressure, temperature and/or other sensors to determine, for example and without limitation, ambient air pressure, temperature and humidity as air flow 202 enters the system.

In the example shown, the air passing through the MAF sensor 220 goes to a compressor 224 of a turbocharger 222. The turbocharger 222 provides torque to the compressor 224 from a turbine 226 positioned in the exhaust gas airflow from the engine 210. Using this torque, the compressor 224 will compress the air, raising the pressure and temperature thereof, which may also be referred to as charging the air. Air pressure at the intake to the compressor 224 (position 0a) can be estimated from a model using the output of the MAF sensor 220 and ambient conditions at position 0. In some configurations, a pressure sensor may be provided at the output of the compressor, providing a boost pressure measurement for position 1. In some other configurations the pressure at position 1 may be calculated or estimated from a model using, for example a throttle model and a sensed pressure at the intake manifold of the engine 210. Some of the features of modelling and measuring are discussed further below after discussion of exhaust gas recirculation is introduced.

To enhance efficiency of the engine 210 (and limit temperature extremes) the compressed air then passes through a charge air cooler (CAC) at 230. Downstream of the CAC 230 is an adjustable choke valve (ACV), shown at 232. The ACV 232 serves as the throttle in the system 200. A recirculation valve (RCV) may be included, if desired. The RCV may be placed to allow recirculation of the output of the compressor back to its input, enabling prevention of turbocharger surge and operating to reduce pressure at the compressor output if the ACV 232 is closed, for example.

Air passing through the ACV 232 goes to the engine intake manifold 214. An intake manifold absolute pressure sensor and temperature sensor are provided at the intake manifold, providing pressure and temperature readings at position 2. The air enters the cylinders of the engine 210, where combustion with fuel injected by the fuel injector 212 occurs. Following combustion, the air, now mixed with fuel (at least some of which has combusted) exits the engine at the exhaust manifold 216. Temperature at location 3, as shown, can be estimated according to a model by the system monitor using several inputs including the measured conditions at position 2 along with engine speed and fuel injection parameters, where the engine speed is measured by well-known magnetic measuring device, and fuel injection parameters are obtained from the fuel injector 212 control signal. Further inputs for estimating temperature at location 3 may include estimated charge mass flow (summation of the measured mass through the MAF sensor and estimated EGR flow) and, typically, using ignition angle and air-to-fuel ratio. Although pressures and temperatures along the exhaust side may be measured if desired, this is not typically the case. Instead the exhaust side temperatures and pressures are typically estimated using the air path model, accounting for individual component models described below and can be computed by solving a set of equations which are then solved iteratively.

The exhaust gasses from the exhaust manifold 216 are directed back to the turbocharger 222 and power the turbine 226. As the exhaust air passes through the turbine 226, the turbine spins and drives the compressor 224. The turbine 226 and/or compressor 224 of the turbocharger 222 may include variable geometries, if desired. For example, turbine 226 may be a variable nozzle turbine (VNT). An electric motor (E-Turbo) may, optionally, be provided to enhance operation of the turbocharger 222, particularly at low engine speeds where the turbine 226 may not provide sufficient force to the drive the compressor 224 to sufficiently charge the airflow.

A wastegate (WG) 240 is provided to control the turbocharger 222. In the design shown, the WG 240 is a controllable valve that selectively allows exhaust gasses from the exhaust manifold 216 to bypass the turbine 226. To increase turbocharger 222 speed, the WG 240 position is modified to reduce the quantity of gas passing through the WG 240; conversely, to reduce turbocharger 222 speed, the WG 240 position is modified to allow more gas through the WG 240. In some examples only one of the VNT or WG 240 is included, though both may be included in other examples.

Pressure and temperature at position 4, exiting the turbine 226, can be estimated from an iterative problem solution, determining estimates in a counter-flow manner starting from ambient pressure at the exhaust port (tail pipe, for example) and working backward to the exhaust manifold for pressures, and for temperatures starting with the exhaust manifold temperature and working downstream to positions 3, 4 and 5. After exiting the turbine, the exhaust gasses are subjected to after-treatment, here shown as a three-way catalytic (TWC) converter unit 242. The design shown may be for a gasoline engine; different and/or additional after-treatment components may be included for other fuels. For example, a diesel engine may include a particulate filter, NOx trap, etc., as desired.

An exhaust gas recirculation (EGR) system is provided, with an EGR cooler 250 and an EGR valve 252, coupled to the exit of the TWC 242. The exhaust gasses are first cooled by the EGR cooler 250 and then pass through the EGR valve 252. By recirculating exhaust gasses, the composition of the airflow into the compressor 224 can be controlled. The use of an EGR, generally, is well known in the art as allowing the introduction of inert gasses into the combustion chamber of the engine. EGR may also be used in a gasoline engine to reduce throttling or pumping losses and/or engine knocking. In the context of a diesel engine, EGR can be useful to reduce certain environmentally harmful emissions, particularly NOx. Some examples may use a three-way EGR valve that controls both airflow from the MAF sensor and airflow from the EGR cooler 250. It may be noted that some systems omit an EGR feature and, in the absence of an EGR feature, the MAF sensor is sometimes omitted.

A low pressure EGR system is shown, recirculating exhaust gasses after exiting the turbine 226. Low pressure EGR is relatively more common in gasoline engines. A high pressure EGR (which recirculates exhaust gas from the exhaust manifold 216 to the intake manifold 214) may be provided in diesel engines. Some examples may omit EGR entirely or may have both high and low pressure EGR.

With the configuration shown, temperature at the intake of the compressor 224 is computed, in the case of the presence of low pressure EGR 252, from enthalpy balance of mixing fresh air of known mass flow (given by the MAF sensor 202) and ambient temperature, and recirculated exhaust gas having a temperature that may be sensed at the inlet of the EGR valve 252 or estimated using a heat exchanger model for the EGR cooler 250 and the temperature calculated for position 5. The mass flow of the recirculated gas is estimated from EGR valve inlet and outlet pressures, EGR gas temperature and EGR actuator position. The pressure at the compressor 224 outlet may be measured by the boost pressure sensor.

Exhaust gasses that are not recirculated by the EGR valve 252 pass to the exhaust 244. A Fuel-Air Mix (FAM) sensor may be provided as part of the exhaust 244. The FAM sensor may include, for example and without limitation, a universal exhaust gas oxygen (UEGO) sensor, a Lambda sensor, and/or other sensors. The FAM sensor in some examples is configured to output a measurement relative to an air-fuel equivalence ratio, usually denoted the symbol Lambda ($\lambda$) and measures the proportion of oxygen (O2) in the exhaust gasses. Pressure and/or temperature at position 5 may be modeled using the known geometry of the various system components and the pressure and temperatures calculated for position 4, among other data inputs.

Figure 3A:
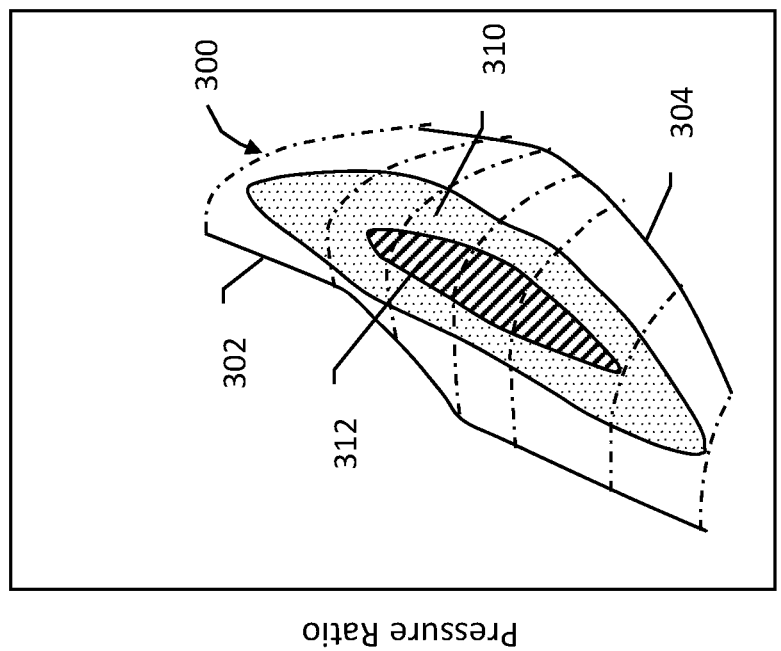
FIG. 3A-3B show compressor and turbine maps.

FIG. 3A shows an illustrative and simplified compressor map. The compressor map uses corrected air mass flow as the X-axis, and the pressure ratio of the compressor as the Y-axis. Several turbocharger speed lines 300 cross the graph and are associated with different turbocharger speeds. Boundary conditions are included, with a surge line 302 on the left side of the drawing, and a choke line 304 on the right side of the drawing. The surge line 302 indicates the maximum pressure the turbocharger can generate at a given mass flow. The choke line 304 indicates the maximum amount of mass flow at a given pressure ratio. Operation outside of these boundaries 302, 304 is usually avoided to prevent degraded or unpredictable operation as well as potential damage to components.

The efficiency of a compressor reflects the ability to compress air without adding heat. The higher the efficiency, the cooler the outlet temperature for a given boost pressure (though still exceeding ambient temperature). Efficiency islands are shown in the graphic at 310 and 312, with each "island" defining combinations of factors resulting in improved efficiency. For example, operating inside the boundary 310 may correlate to efficiency at or above 65%, and inside island 312 may correlate to an efficiency of 75% or higher.

Figure 3B:
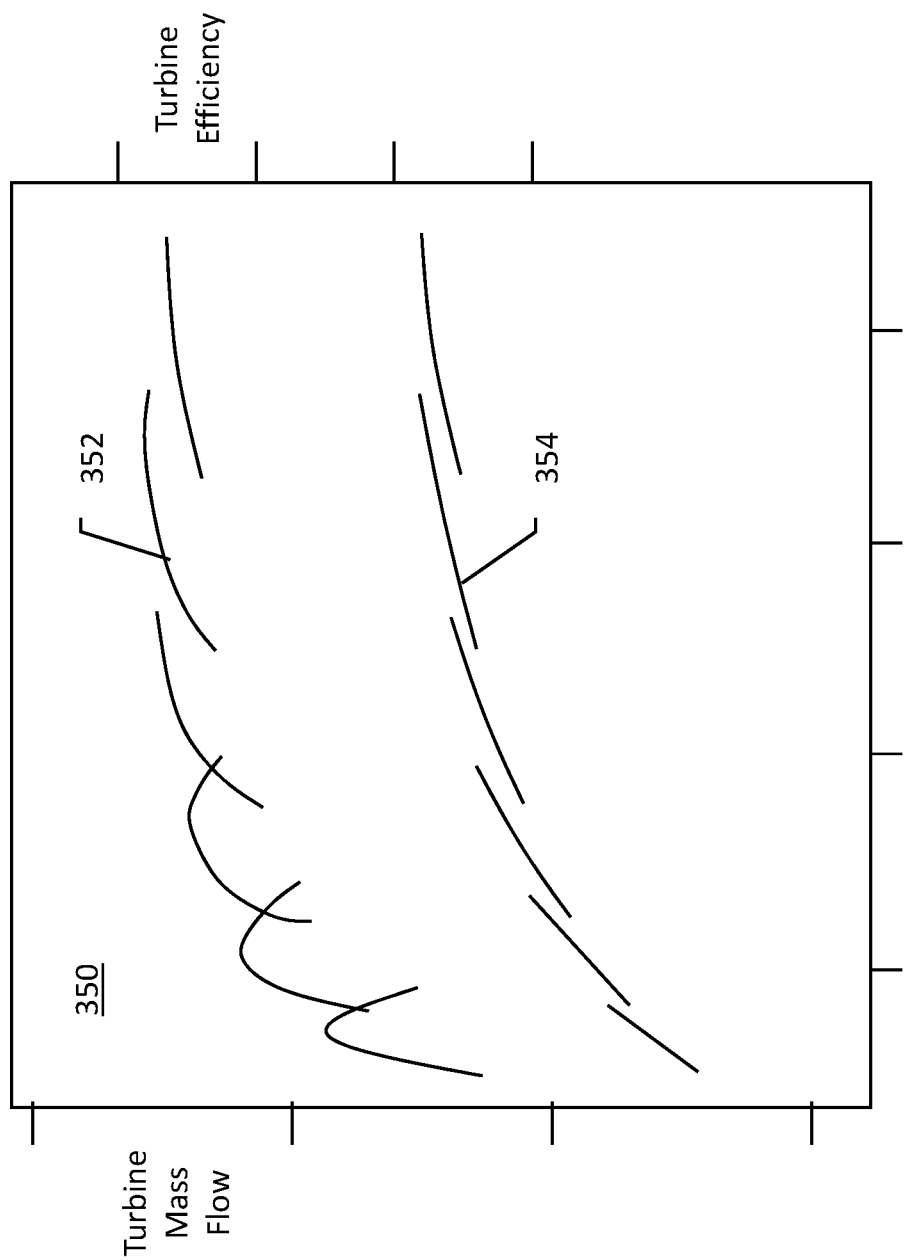

FIG. 3B shows an illustrative and simplified turbine map 350. This map uses the turbine pressure ratio as the X-axis, and places turbine mass flow and turbine efficiency on the Y-axis. Within the turbine map 350 there are several paired curves each associated with a turbine speed. Thus, for example, for a given turbine speed, a turbine efficiency curve is shown at 352, and the turbine mass flow is shown at 354, each as a function of the turbine pressure ratio. As can be seen, as the pressure ratio increases, efficiency becomes flatter at a given speed, while the mass flow increases as well. As with FIG. 3A, the turbine map provides an understanding of the turbine efficiency in view of other parameters, allowing the obtained torque of the turbine to be understood from the mass flow and pressure ratio.

It should be understood that the turbocharger speed, compressor speed, and turbine speed all refer to the speed of rotation of the turbocharger shaft which couples the compressor to the turbine, and so the three terms may be used interchangeably. For a given turbocharger installation, testing can be performed at a test stand to establish the maps in FIGS. 3A-3B, and the ECU and/or system monitor stores representative data for use in control operations. Factors for use in system control, such as by MPC, PID and/or LQR, are then derived using the maps and other system characteristics, as well as, at least in some examples, user inputs. The maps in FIGS. 3A-3B are simplified; maps or stored data may have greater granularity. Maps may also be represented by multivariate functions in some examples, using well known techniques. In the context of the present disclosure, these maps may be used to translate some of the measured or inferred air system parameters (mass flow, temperature and pressure) to obtain values indicating turbocharger speed and efficiency.

Figure 4:
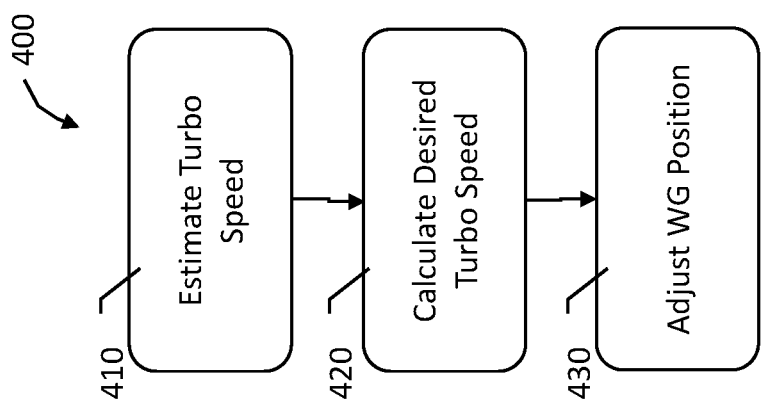
FIGS. 4-5, 6A-6B, and 7-10 show several illustrative methods and method steps in block form.

FIGS. 4-8 show several illustrative methods and method steps in block form. In FIG. 4, a reference or estimated turbocharger speed is calculated at 410. In block 410, the turbo speed is estimated. In some examples, measured pressures and temperatures, and modeled pressures and temperatures are used to calculate an estimated turbocharger speed, rather than obtaining a measured turbocharger speed. Some systems may include a turbocharger speed measuring device, which may be used to identify aging, malfunctions, etc., as well as to correct or validate the underlying model. However, due to cost considerations turbocharger speed may not be measured in all systems. Turbo speed is a function of the pressures before and after the compressor, the mass flowing through it, and the temperature at the compressor input:

$$N_{TC}=F_{Ncmp}(p_1, m_{Ch}, p_{0a}, T_{0a}) \quad [\text{Eq. 2}]$$

Where $p_1$ is the pressure downstream of the compressor, also referred to as the boost pressure, $m_{Ch}$ is the mass flow into the compressor (sometimes referred to as charge flow), $p_{0a}$ is the compressor inlet pressure, and $T_0a$ is the compressor inlet temperature. Each of $m_{Ch}$, $p_{0a}$, and $T_0a$ may be calculated using the airflow model for the system. That is, for a model as shown in FIG. 2, these values reflect the condition and quantity of gasses flowing through the MAF sensor 220 and the EGR valve 252. One approach is to sum the measured MAF from the MAF sensor 220 and an estimated EGR airflow, while in some examples the charge flow is estimated from a volumetric efficiency model combining the two together. In other examples, each of EGR and an MAF sensor can be omitted, and the charge flow mass estimated by the use of the system airflow model. The exact function applicable from Equation 2 may be determined using a test station or other test setup; the function may be approximated to a rational polynomial, for example, that serves as a reasonable approximation within typical operating limits for the pressures, temperature and mass flow.

A system, such as one having a controller for implementing stored instructions, that can perform as described for block 410 may serve as a virtual turbocharger speed "sensor" (VRTSS). The VRTSS may rely on measured and inferred mass flow, temperature and pressure at different positions in the system. A number of these measured and inferred parameters are available to a control system for various other purposes in the engine, as for example when air flow is monitored to optimize engine performance (power, emissions, fuel efficiency). The VRTSS can thus reuse at least some data that is already being tracked for other purposes. Moreover, because it is virtual, the VRTSS can be readily implemented into a forward-looking control algorithm such as model predictive control (MPC) that creates estimates of future performance during a time horizon.

The method next determines desired turbocharger speed, as indicated at 412. The desired turbocharger speed is determined using the target boost pressure, as well as airflow metrics, as shown in Equation 3:

$$N_{TCdes}=F_{Ncmp}(p_{1des}, m_{Ch}, p_{0a}, T_{0a}) \quad [\text{Eq. 3}]$$

Here, $p_{1des}$ is the target boost pressure provided by the system monitor, while, $m_{Ch}$, $p_{0a}$, and $T_{0a}$ are as described above. Wastegate position can then be adjusted to modify the system operation, as indicated at 430. However, rather than a simple command to open or close to some extent based on whether the turbocharger speed is above or below a target, the command to the wastegate is, in some examples, determined by further analyzing the power balance of the turbocharger and the current turbocharger speed value. This can be done by first starting with the torque balance on the turbocharger shaft:

$$\frac{d\omega}{dt} = \frac{1}{J \cdot \omega}(P_t - P_c) \quad [\text{Eq. 4}]$$

Where $\omega$ is the turbocharger shaft angular speed (it may be noted that the angular speed is in radians per second, while N as used in Equations 2 and 3 refers to revolutions per minute), $P_t$ is the turbine power obtained from the exhaust airflow, $P_c$ is the compressor power provided to the charge compressor airflow, and J is the moment of inertia of the turbocharger rotor. The moment of inertia, J, can be specific to the turbocharger and is a constant. In the analysis, $P_c$ can be treated as a disturbance, and the turbocharger speed (whether expressed as $\omega$ or as N) is controlled by operation of the wastegate. Using the turbocharger kinetic energy can be used as a starting place to allow the control solution to be reduced to a linear equation. Starting with the definition of kinetic energy:

$$E = \frac{1}{2}J \cdot \omega^2 \quad [\text{Eq. 5}]$$

This formula can be substituted into Equation 4, as shown by Equation 6:

$$\dot{E}=P_t-P_c \quad [\text{Eq. 6}]$$

Here, the change in kinetic energy of the turbocharger shaft is simply the difference between power obtained at the turbine and power expended at the compressor (ignoring frictional losses).

Next, the turbine power can be manipulated by control of the wastegate. The manipulated variable can be the desired turbine power, denoted as $P_{tdes}$. The desired turbine power may not match the actual turbine power, $P_t$, spinning the turbocharger—this desired power needs to be transformed to desired wastegate position; this transformation may not be done accurately and actual actuator position may lag after the desired one. The discrepancy is addressed below; for Equation 7, it is assumed that no discrepancy exists:

$$P_{tdes} = u + P_c \quad \text{[Eq. 7]}$$

This makes u, the acceleration power, the new manipulated variable. Compressor power is computed from engine data as described below. The kinetic energy rate of change $\dot{E}$ is thus equal to u. The new manipulated variable u is computed to drive the turbocharger kinetic energy (based on estimated turbocharger speed) towards the desired turbocharger energy $E_{des}$ based on desired turbocharger speed $N_{TCdes}$. Controlling E to push it to equal $E_{Des}$, will also drive $N_{TC}$ towards $N_{TCdes}$. And (under a justifiable assumption of monotonicity of the right side of Equation 3 with respect to $p_1$) this will also drive $p_1$ to $p_{1des}$, which achieves the main purpose of boost control. Hence, using a series of nonlinear transformations based on engine models, the above sequence converts a highly nonlinear control problem of controlling boost pressure by controlling wastegate position to a very simple problem of controlling kinetic energy and the turbocharger rotating inertia by use of an acceleration power.

In operation, the ECU or other controller may be operable to issue command signals to control the WG to minimize the distance between the target boost pressure and an actual boost pressure, while preventing turbocharger speed from exceeding a predefined maximum speed. Such steps may include, for example, issuing a command to open the WG either to prevent turbocharger overspeed or to prevent actual boost pressure from exceeding target boost pressure. Opening the WG diverts exhaust gasses away from the turbine, reducing the power that the turbine of the turbocharger can obtain from the exhaust gas flow. In other conditions, the ECU or other controller may issue a command to close the WG to raise the actual boost pressure when below the target boost pressure. Closing the WG directs more of the exhaust gasses to the turbine, increasing the power delivered to the turbocharger from the exhaust gas flow.

Figure 5:
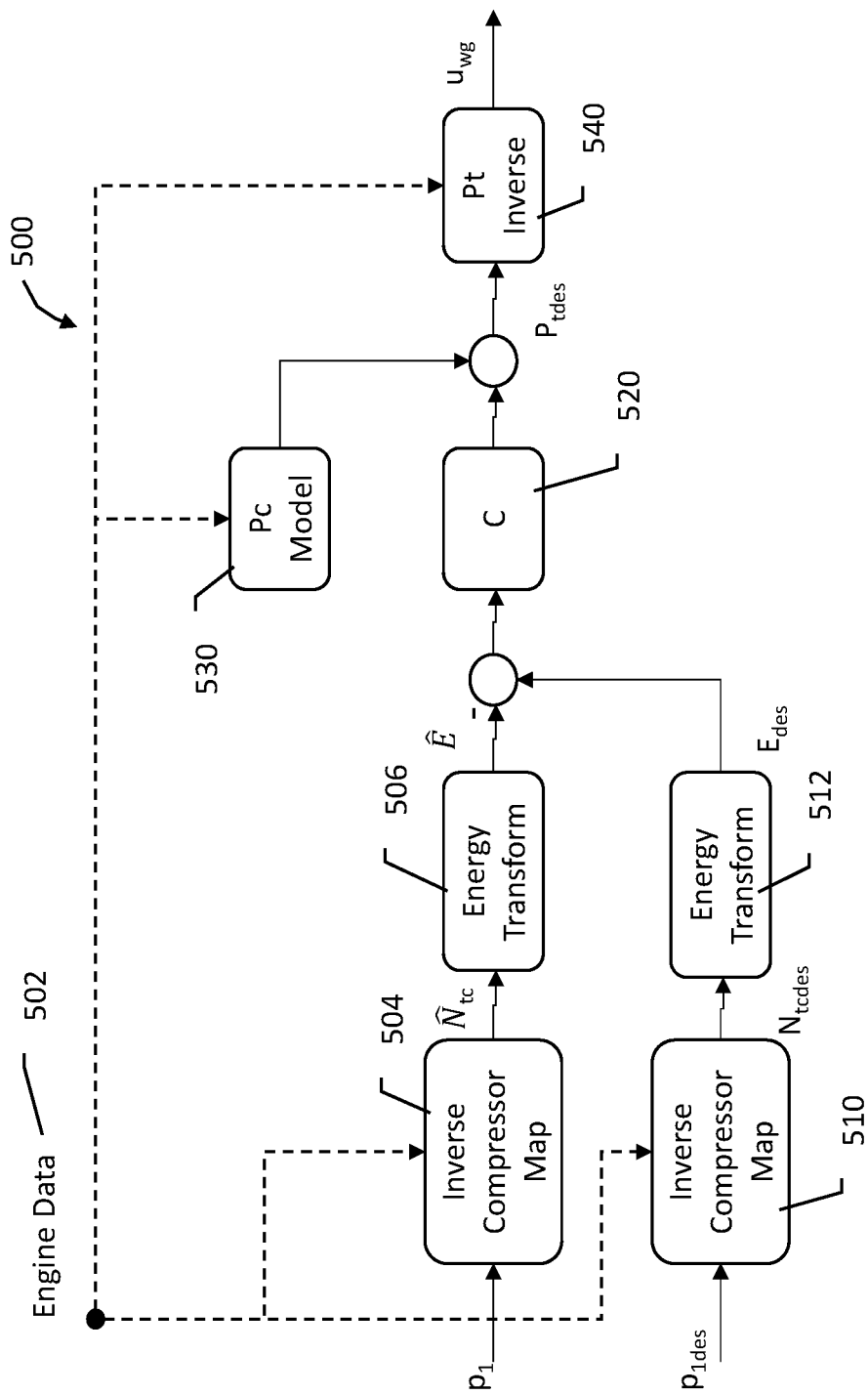

FIG. 5 illustrates a simplified control method in steps that more fully illustrate a closed loop approach to generating the control signal. In FIG. 5, the control method is shown generally at 500 and starts by extracting engine data to be provided to the inverse compressor maps to calculate an estimated turbocharger speed, $\hat{N}_{tc}$ using the modeled or measured boost pressure, $p_1$ as indicated at 504, and a desired turbocharger speed $N_{tcdes}$ using the target boost pressure, $p_{1des}$, as indicated at 510. The estimated and desired turbocharger speeds undergo energy transformations at 506 to yield the estimated kinetic energy of the turbocharger $\hat{E}$, and at 512 to yield the desired kinetic energy, $E_{des}$. The difference between the two kinetic energies is calculated and fed to the loop controller C, at 520. The loop controller may be, for example, a PI controller.

To provide an added feed-forward element to the loop model, the compressor power model is supplied into the loop from block 530. The inverse turbine power model is then used, as indicated at 540, providing the output control signal, $u_{wg}$ to be issued to the WG. The model in FIG. 5 is illustrative and does not account, for example, for the maximum compressor speed, desired smoothing effects, compressor and turbine model uncertainties, and wastegate loop dynamics such as the lag between desired and actual wastegate position, which can be addressed below as part of tuning.

Figure 6A:
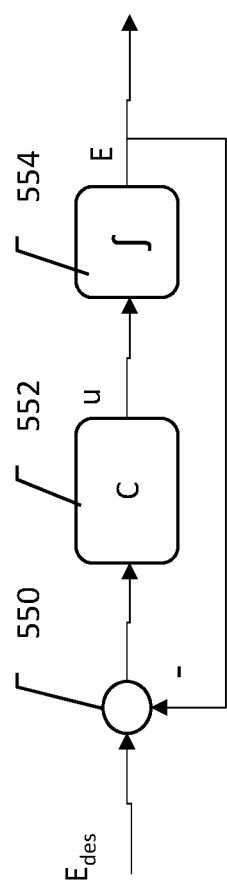

As shown in FIG. 6A, the result is a simple feedback loop. The desired kinetic energy, $E_{des}$, has the calculated kinetic energy subtracted at 550, with the difference supplied to the loop controller 552. The loop controller 552 generates the output control signal u, and this is integrated over time in the controlled system as indicated at 554. The integration at 554 reflects the turbocharger inertia. Through further measurement, the calculated kinetic energy, E is again calculated, and is again fed back to be subtracted from $E_{des}$ as the loop continues to operate.

Figure 6B:
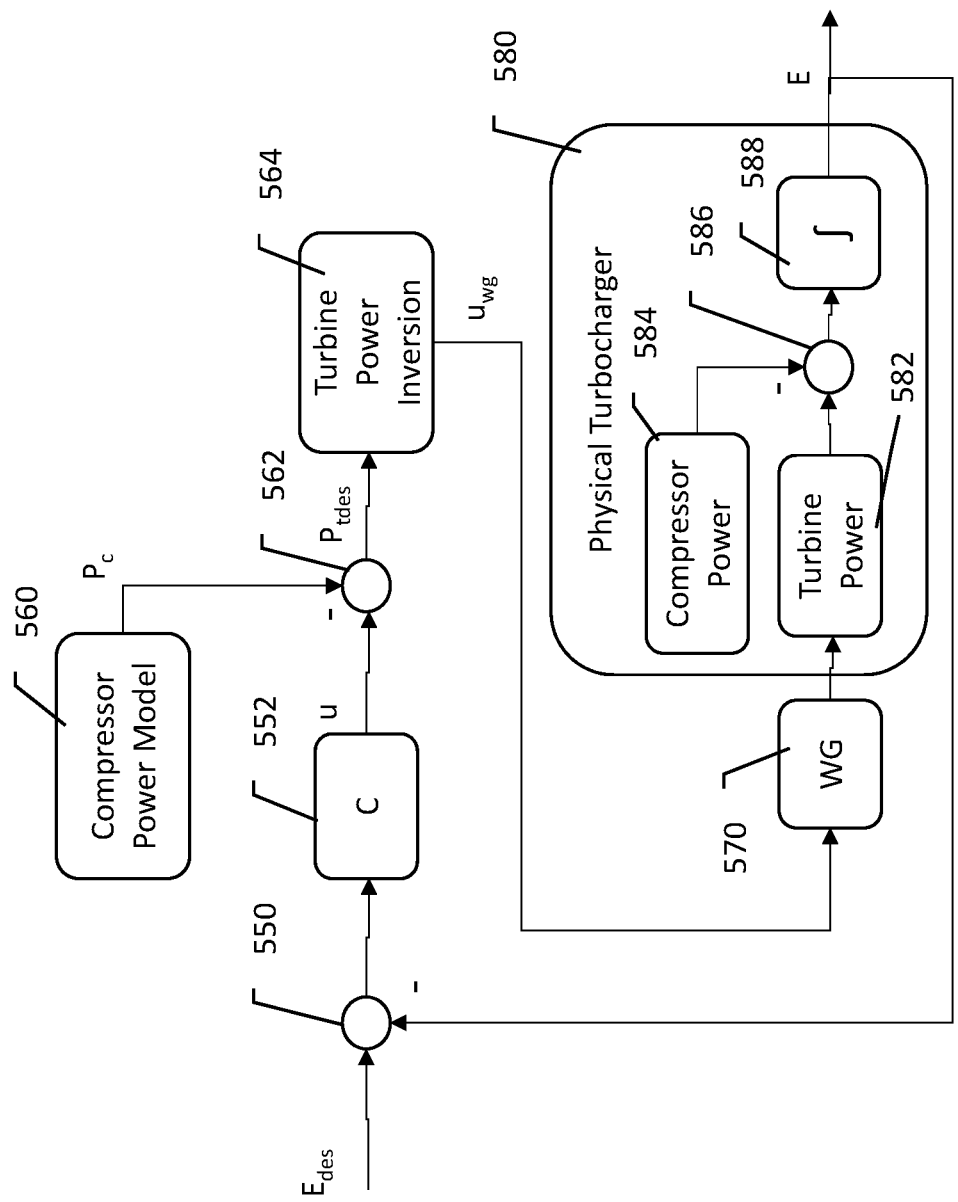

FIG. 6B integrates further system elements, adding further factors to FIG. 6A. Starting from the desired kinetic energy, $E_{des}$, the calculated kinetic energy, E, is subtracted at 550 and the difference is supplied to the loop controller 552, which generates an output control signal u. The compressor power is estimated at 560 and added to u as indicated in Equation 7, above, at 562. The turbine power inversion is applied at 564 to generate the control signal $u_{wg}$, which is applied to the wastegate at 570. The physical turbocharger model is then integrated at 580, with position of the WG 570 affecting turbine power 582, from which the compressor power 584 is subtracted at 586. The resulting power difference is integrated on the turbocharger drive shaft as indicated at 588, and the calculated kinetic energy, E, results. E is fed back to the loop, which goes to a next iteration with the difference calculation at 550. The more complex loop in FIG. 6B illustrates several nonlinear dependencies. In particular, the link between WG position and turbine power 582 is nonlinear, at least partly due to turbine airflow and efficiency characteristics. The loop controller C and predictive reference governor are each further developed as discussed below.

As noted above, there remain several discrepancies in the simplified model, wherein the difference between the formula in Equation 7 and the real application to a physical system. The above models are expanded in greater detail below. Compressor power can be computed from the enthalpy balance using equation 8:

$$P_c = c_{pAir} \cdot m_{Ch}(T_1 - T_{0a}) = \frac{1}{\eta_c} c_{pAir} \cdot m_{Ch} \cdot T_{0a}\left(\left[\frac{p_1}{p_{0A}}\right]^{\frac{1-\gamma}{\gamma}} - 1\right) \quad \text{[Eq. 8]}$$

In this equation $c_{pAir}$ is the specific heat of fresh air, $\gamma$ is the specific heat ratio (approximately 1.4 for air), and $\eta_c$ is the compressor efficiency, which is obtained from the turbocharger compressor map. Equation 9 shows the equivalent relationship for the turbine:

$$P_t = \quad \text{[Eq. 9]}$$

$$c_{pExh} \cdot m_{Trb}(T_{TrbIn} - T_{TrbOut}) = \eta_T c_{pExh} \cdot m_{Trb} \cdot T_{trbIn}\left(1 - \left[\frac{p_3}{p_4}\right]^{\frac{1-\gamma}{\gamma}}\right)$$

Here, $c_{pExh}$ is the specific heat of the exhaust gasses, and $\eta_t$ is the turbine efficiency, obtained from the turbocharger turbine map. The mass flow through the turbine can be modelled, to a reasonable degree of approximation, as shown in Equation 10:

$$m_{Trb} = \frac{m_{Ch} + m_F}{f_{WG}(u_{WG})} \quad [\text{Eq. 10}]$$

Equation 10 accounts for the addition of the fuel to the mass air flow through the compressor, and for the reduction in flow due to the WG by the factor $f_{WG}$, which is dependent on the control signal to the WG, $u_{WG}$. Turbine inlet pressure can be represented as a function of turbine outlet pressure p4, turbine inlet temperature $T_{trbIn}$ and turbine flow mass, $m_{Trb}$. Equation 11 provides a characterization:

$$P_t = F_{Pt}(u_{WG}, p_4, T_{trbIn}, m_{Ch}+m_F, \eta_T) \quad [\text{Eq. 11}]$$

The role of the inverse power block 564 is to obtain, for a desired turbine power $P_{tdes}$, the corresponding actuator position control signal $u_{wg}$ by solving equation 12:

$$P_{tDes} = F_{Pt}(u_{WG}, p_4, T_{trbIn}, m_{Ch}+m_F, \eta_T) \quad [\text{Eq. 12}]$$

Equation 12 can be solved at a given $P_{tdes}$ with an unknown $u_{wg}$. Directly using equation 12 may create control difficulties because the solution may be very sensitive to pressure in certain ranges of operation while the wastegate's ability to cause output changes is relatively limited, for example when the wastegate is nearly open (maximum bypass of mass flow away from the turbine). With the wastegate fully open or nearly fully open, large actuator position changes would be needed to cause relatively minor changes in the pressure, making for unnecessary actuation and wastegate movement resulting in early aging due to wear. For this reason, in some examples, the solver can use an approximate solution to the power inverse problem, providing quieter operation of the wastegate while maintaining desired power tracking.

Equation 6 relies on compressor and turbine models that are subject to uncertainty and error for a range of reasons. Individual component models typically are too simple to reflect the system complexity, and input data is uncertain in the turbulent flow environment. This is particularly true on the exhaust side (related to turbine power) due to the absence of measuring instrumentation, as well as the complex physical phenomena (thermal loses and pressure oscillations). Further, power loss due to friction is not yet accounted for, either. Because of the integrating nature of the model in Equation 6, the errors would accumulate, and an open loop model could quickly diverge from true values. Feedback correction is advisable.

The effect of all possible modelling errors are aggregated to a single power disturbance denoted as v in the following update to Equation 6:

$$\dot{E} = P_t - P_c + v \quad [\text{Eq. 13}]$$

Figure 7:
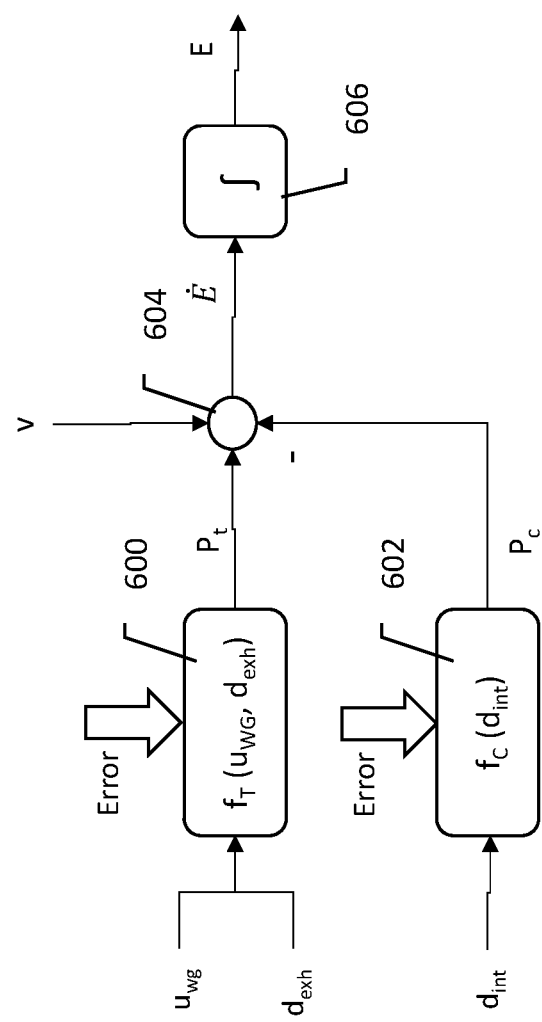

A further analysis can be used to account for the disturbance, v, as shown in FIG. 7.

FIG. 7 illustrates the kinetic energy model. In this further example, the turbine power, $P_t$ is calculated at 600, as a function of exhaust side data $d_{exg}$ and the wastegate position $u_{WG}$, incorporating some degree of error, as indicated. The compressor power is also calculated, at 602, as a function of the intake side data $d_{int}$, again incorporating some degree of error. At 604, equation 13 is applied, yielding the change in kinetic energy, which is fed to an integrator model at 606 and the kinetic energy is calculated. The value of the disturbance, v, needs to be estimated so that the modelled energy E in Equation 13 and in FIG. 7 matches the real turbocharger energy. The disturbance model of the form shown in Equation 14 is assumed:

$$\dot{v} = 0 \quad [\text{Eq. 14}]$$

The error estimation thus becomes a task of state estimation for a model represented by Equations 13 and 14, using a state observer. One possible state observer that may be used is a Kalman filter.

Figure 8:
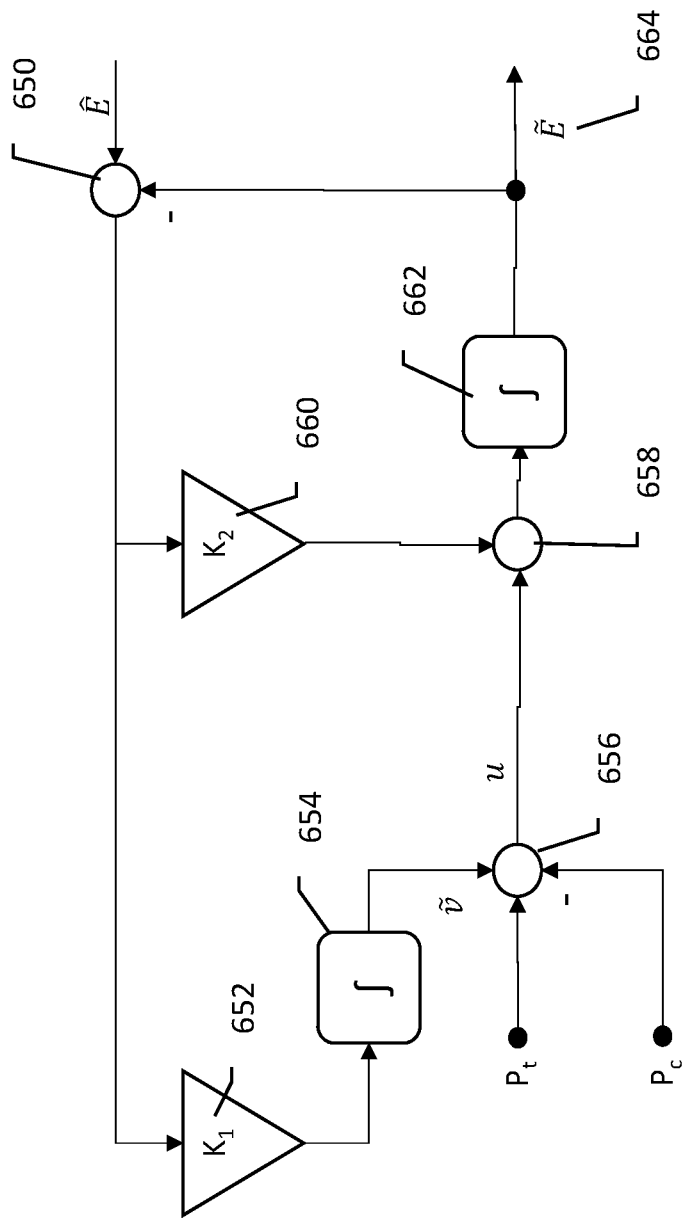

FIG. 8 illustrates applying Kalman filtering to the problem. Here, the observer performs state correction with linear feedback from the output tracking error using observer gains. As illustrated, the energy, $\hat{E}$, from the process measurement is computed using the sensor data, a turbocharger speed model, and the energy transform shown above. The difference between the energy $\tilde{E}$ and the observer's estimate of output energy, $\hat{E}$, is calculated at 650 to calculate an output tracking error. The output tracking error is provided to a first Kalman gain K1 652 and a second Kalman gain K2 660. The output of the first Kalman gain K1 652 is provided to an integrator 654, which determines the estimated disturbance $\tilde{v}$. The estimated disturbance may be understood as augmenting Equation 7, as shown now in Equation 15:

$$P_{tdes} = u + P_c - \tilde{v} \quad [\text{Eq. 15}]$$

Thus the disturbance represents the tracking error then present in the observer function, serving as an adjustment to the desired turbine power value to reduce error.

Turning back to FIG. 8, the estimated disturbance is added to $P_t$ (estimated from the turbine power model using the actual wastegate position, as in Equation 9), and $P_c$ (from the compressor power model, as in Equation 8) is subtracted at 656. The result of the addition/subtraction, u, is then summed at 658 with the output of a second Kalman gain function, K2, at 660. The output at 658 passes to a model integrator 662, providing the observer estimate of turbocharger energy at 664. The observer energy estimate at 664 is fed back to 650. The observer estimate 664 will be a smoother output than the process measurement due to the use of the Kalman filter. By using the smoother observer estimate $\hat{E}$ as the controller feedback, the resulting output commands to the WG can be smoothed as well, reducing actuator wear.

Figure 9:
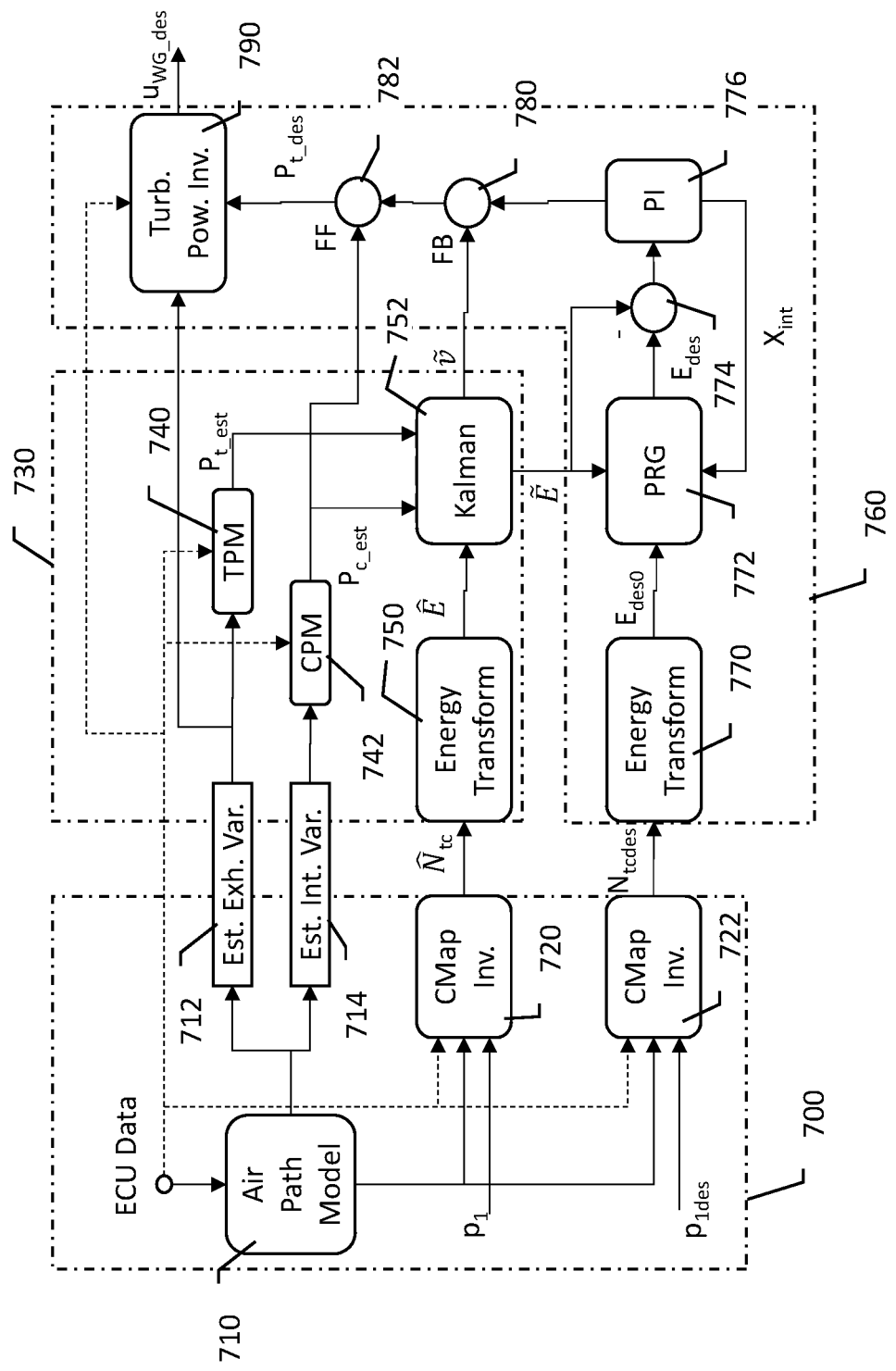

FIG. 9 integrates several of the above methods in a system example. The overall example comprises three main parts, the turbocharger speed estimator 700, the energy observer 730, and the energy controller 760.

The turbocharger speed estimator 700 uses the system air path model at 710, and generates estimated exhaust variables 712 and estimated intake variables 714, which are provided to the energy observer 730. The turbocharger speed estimator supplies ECU data, as for instance the boost pressure $p_1$, and variables from the air path model 710 to calculate the estimated turbocharger speed using the inverse compressor map 720. In parallel, the turbocharger speed estimator uses ECU data, the desired boost pressure $p_{1des}$, and variables from the air path model 710 to calculate the desired turbocharger speed using the inverse compressor map.

The energy observer 730 receives ECU data and the estimated exhaust variables 712 and combines these in the turbine power model 740 to yield an estimated turbo power. The ECU data and estimated intake variables are combined in the compressor power model 742 to calculate an estimated compressor power. The estimated turbocharger speed is supplied to an energy transform block 750 to provide the estimated turbocharger energy. Each of the estimated turbine power, estimated compressor power, and estimated turbocharger energy at combined in a Kalman filter 752 to obtain an energy observer output energy $\tilde{E}$ and the energy observer disturbance $\tilde{v}$.

The energy controller 760 performs an energy transform on the desired turbocharger speed at 770, determine a desired turbocharger energy $E_{des0}$, which is not yet corrected in this example for maximum turbocharger speed. A predictive reference governor (PRG) at 772 uses the observer output energy $\tilde{E}$ and the un-limited desired turbocharger energy $E_{des0}$ with a controller state value $X_{int}$ to calculate a corrected desired energy, $E_{des}$.

The PRG 772 is a higher level controller operating in cascade with the feedback loop described above. It takes the raw energy setpoint $E_{des0}$ and computes corrected desired energy, $E_{des}$, that is fed to the control loop already described. The combination forms a hierarchical controller, where the PRG is on the top level. It is an advanced controller whose main purpose is guaranteeing that turbocharger is within the speed limit; moreover, it is also capable of improving energy tracking by optimal utilization of available turbine power. The lower level controller described in previous paragraphs provides feedback linearization, pre-stabilization and reduces uncertainties for the upper level controller. PRG is thus a turbocharger overspeed protection feature. In some examples, the PRG 772 is a MPC controller using a linear, pre-stabilized internal model capturing the dynamics of the energy control loop. Thus FIG. 9 shows that the overall controller 760 includes each of a high level controller (PRG 772) configured to transform the setpoint $E_{des0}$ based on the desired boost to the corrected desired energy $E_{des}$, and a low level controller as a PI control with feedforward from the compressor power model, disturbance compensation and power inversion, with the low level controller at 776. Added details for some illustrative examples are provided below in association with FIG. 10.

The energy observer output energy $\tilde{E}$ is subtracted from the corrected desired energy $E_{des}$ at 774, generating an energy differential or acceleration signal (as discussed above), which is then passed through a proportional-integral (PI) controller 776, which passes through a proportional-integral filtered control signal. The disturbance from the Kalman filter 752 in the energy observer is subtracted at 780, modifying the feedback signal in accordance with the errors/disturbances calculated in the Kalman filter 752.

Next, the compressor estimated power from block 742 is added at 782 to the feedback signal from block 780. The turbine desired power results, and is fed to the turbine power inversion at 790 to generate the wastegate command signal. The turbine power inversion 790 may be based on the turbine map, or may be a solver for Equation 10, above.

Figure 10:
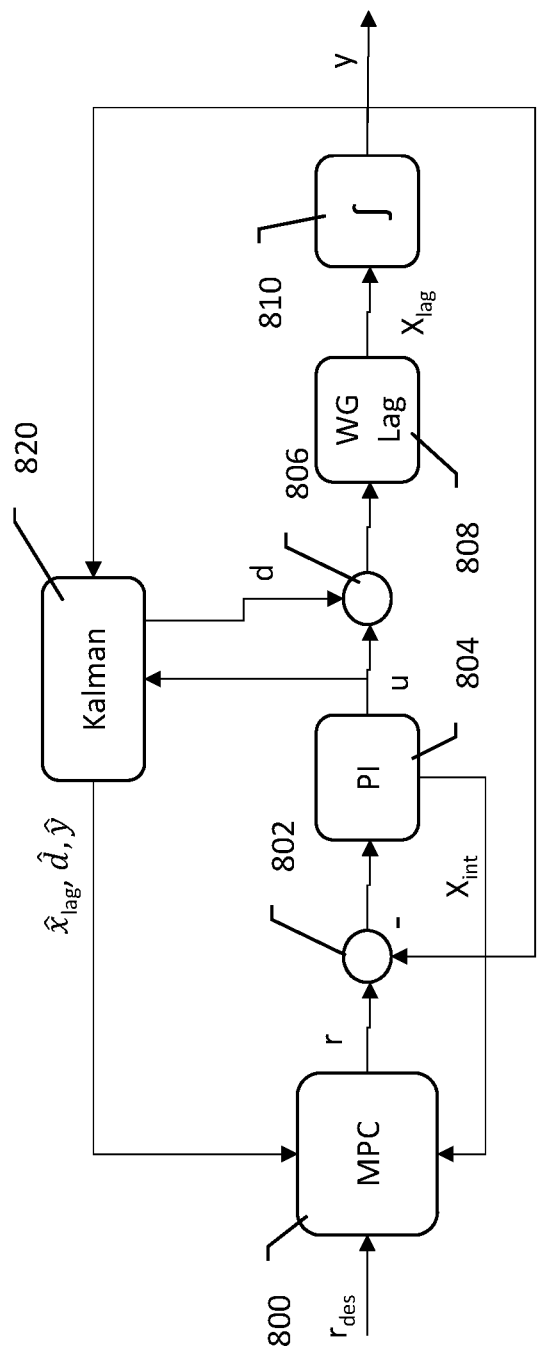

FIG. 10 shows a cascade configuration for the PRG 772 in FIG. 9 with the subordinate control loop of FIGS. 6A-6B, with the added refinement of a linear filter modelling the lag in the wastegate actuator. The subordinate loop in FIG. 10 shown in the simplified form where the physical WG nonlinearity is cancelled by turbine power inversion, and the compressor power is compensated by the feed-forward from the compressor model, as well as the power disturbance is compensated by its estimate from the Kalman filter 752.

As shown by FIG. 10, the PRG controller may be a linear MPC controller 800, which converts the desired setpoint $r_{des}$ to a modified reference, r. An illustrative formation of the optimization problem that the PRG solves is shown in Equation 16:

$$J(r, z_y, z_u) = \sum_{k \in I_r} w_1(k)(r(t+k) - r_{des}(t+k))^2 + \quad \text{[Eq. 16]}$$
$$\sum_{k \in I_r} w_2 \Delta r(t+k)^2 + \sum_{k \in I_y} w_3(k)(z_y(t+k) - y(t+k))^2 +$$
$$\sum_{k \in I_u} w_4(k)(z_u(t+k) - u(t+k))^2 + \sum_{k \in I_y} w_5(k)(y(t+k) - r_{des}(t+k))^2$$

In Equation 16, r is the modified reference (referred to as $E_{des}$ in FIG. 9), while $r_{des}$ is the original setpoint (referred to as $E_{des0}$ in FIG. 9), y denotes the controlled turbocharger kinetic energy, and u is the acceleration power as in Equation 7. In some examples, the original setpoint is presumed to be constant within the time horizon of the optimization. In other examples, such as if previous information related to future engine power demand (for example, with a predictive cruise control available), the setpoint roes may be variable within the time horizon, if desired.

Further in Equation 16, $\Delta r(t+k)$ indicates the increment of $\{r(t+k) - r(t+k-1)\}$; $z_y$ and $z_u$ are slack variables, and weights $w_1$ to $w_5$ are used to prioritize among requirements in Equation 16. Finally, $I_r$, $I_y$ and $U_u$ are integer sets (subsets of $\{1, 2, \ldots N\}$ where N is the prediction horizon. It is assumed here that $\Delta r(t+k)=0$ for $k \notin I_u$. The integer sets are used to limit the size of the quadratic optimization problem to allow on-line solution in the ECU. Equation 16 includes, illustratively (other formulations may be used), five penalty terms using the square of tracking error relative to the original setpoint (minimizing squared differences between the raw setpoint and the corrected setpoint), square of the corrected reference increment (penalizing changes to the modified reference, thus smoothing the output), a soft penalty using energy constraints the square of the distance from the closest feasible point, a soft penalty on the desired acceleration power (limiting large changes), and minimizing the squared difference between the raw setpoint and the predicted energy. The penalty terms may operate, in an example, within the constraints of Set 1:

$y_{min} \leq r(t+k) \leq y_{max} \; \forall k \in I_r$ $y_{min} \leq z_y(t+k) \leq y_{max} \; \forall k \in I_y$ $u_{min}(t) \leq z_u(t+k) \leq u_{max}(t) \; \forall k \in I_u$ [Set 1]

The upper bound on $z_y$ enforces limiting the turbocharger energy and therefore the turbocharger speed.

Figure 11A:
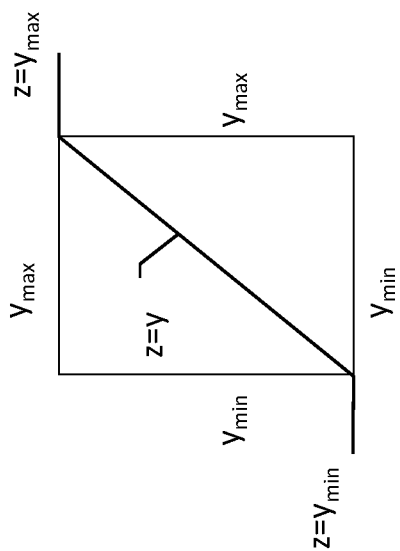
FIGS. 11-11b illustrate two penalties used in an illustrative control method.
Figure 11B:
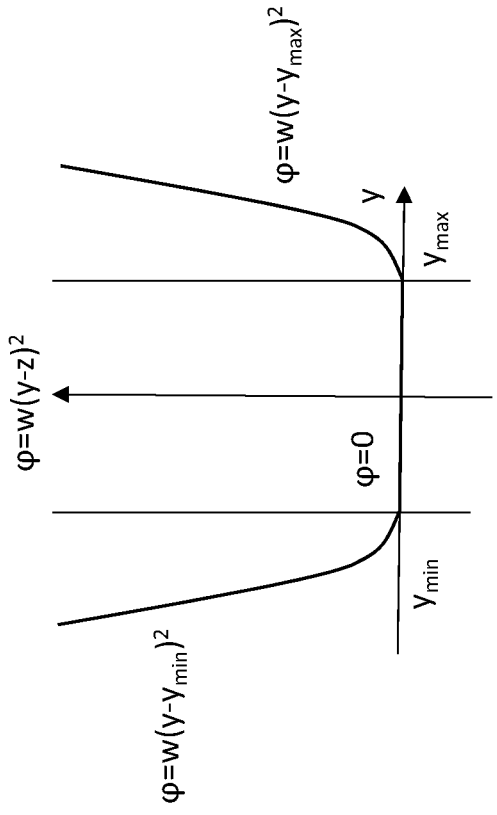

FIG. 11A shows the slack variable operation between minimum and maximum values of y, where z tracks y in linear fashion between its minimum and maximum and has hard stops on either end. FIG. 11b shows a soft constraint penalty as a function of the constrained variable, showing that while y is within its constrained limits the penalty is zero, and rises quickly when y is outside the constrained limits.

The internal model of the MPC can then be defined by the state equations of Set 2, with this model corresponding to blocks 802-810 of FIG. 10:

$d(k+1)=d(k)$ $x(k+1)=x(k)+T_s x_{WG}(k)$ $x_{WG}(k+1)=a^* x_{WG}(k)+(1-a)[d(k)+k_P(r(k)-x(k))+k_1 x_{int}(k)]$ $x_{int}(k+1)=x_{int}+T_s(r(k)-x(k))$ [Set 2]

The variable $x_{wg}$ is the state of the filter representing the WG actuator delay, x is the kinetic energy (as is y), $x_{int}$ is the state of the PI controller, assuming a PI controller is used. If a controller other than a PI controller is used, the model will change accordingly. And the output equations are as shown in Set 3:

$$y(k)=x(k)$$

$$u(k)=k_P(r(k)-x(k))+k_I x_{int}(k) \quad \text{[Set 3]}$$

Throughout the prediction horizon, the disturbance d is assumed to be constant. The variable x is the state of the turbocharger, $x_{WG}$ is the state of the WG loop delay, and $x_{int}$ is the state of the PI controller. The parameters $k_p$, and $k_I$ represent the proportional and integral gain, and parameter a represents the WG loop dynamic; each of these parameters are determined specific to a given implementation. When tested, if the control solution causes oscillation of the WG or overshooting of the turbocharger energy over the setpoint, then the proportional and/or integral gains may be reduced. Alternatively, if the turbocharger response is deemed too slow, the proportional and/or integral gains can be increased. Such considerations may be included in the subordinate loop of FIGS. 5, 6A and 6B, and the same parameters are used here for consistency.

Returning to FIG. 10, the modified reference, r, is provided to block 802 from which the (prior) output of the PRG controller, y, is subtracted. This difference is fed to a PI block 804, that in turn feeds back the state of the PI controller 804, $x_{int}$, to the MPC 800. The PI output control signal, u, is added to the Kalman filter 820 disturbance, d, and the sum is an input to the WG lag block 808. It may be noted that the Kalman filter 820 is not the same Kalman filter as shown above at 752 in FIG. 9, with Kalman filter 820 instead observing a simplified loop and dedicated to the PRG controller.

The WG lag block 808 models the WG and its output, $x_{lag}$, represents a filtered value of (u+d) as the desired acceleration power accounting for a delayed response of the WG actuator. Variable $x_{lag}$ is output to the integrator 810. It should be noted that the Kalman filter at 820 is configured to apply to the model in which the turbocharger shaft balance has been resolved, making the main task of Kalman filter the estimation of $x_{lag}$. Kalman filter 820 serves a different function than, for example, the Kalman filter 752 in FIG. 9, which instead observes the power balance on the turbocharger shaft and computes the energy observer disturbance $\tilde{v}$. WG lag determined by the lowest level actuator controller setting in the ECU and can be derived from testing the WG response, for example, in a bench test, or by analyzing ECU data from the vehicle itself. The integrator 810 represents the turbocharger energy. Each of blocks 806 and 810 may be virtual elements, representing the turbocharger model. The value for y is taken from the energy transformation at 750 in FIG. 9.

The use of MPC with a time horizon as shown in FIG. 10 aids in preventing overspeed by accounting for the turbocharger inertia and WG lag. Absent a predictive control strategy, overspeed would have to be limited by a physical governor, as the WG response may be too slow to prevent overspeed. One approach is to reduce performance in an absolute sense, setting an artificial (reduced) overspeed limit and commanding WG opening automatically when the artificial limit is reached so that WG opening can occur well before overspeed limits are reached. In the solution here, however, the predictive control can observe whether, within the time horizon, the WG command (or a change thereto) and existing turbocharger kinetic energy can be predicted to cause overspeed and, if so, adjustment can be made to the control solution before the command issues.

In each of the above examples, the WG position is referenced for control purposes. In another example, a variable nozzle turbine (VNT) may be used instead of the WG. Using VNT, the restriction on exhaust air mass flow through the turbine wheel is controlled by a row of vanes that move under electric control. The VNT vanes can close to restrict the exhaust air flow through the turbine, thereby increasing turbine power and boost pressure. Alternatively, the moveable vanes open to reduce the flow restriction, reducing power obtained by the turbine relative to the exhaust air mass flow. The VNT can serve as a control mechanism for modulating power to the turbine. As a result, in each of the Figures and formulas above, as well as the discussion thereof, a VNT may be substituted for the WG. While specific calibrations may vary by switching between a WG-based control construct to a VNT-based control construct, the applicability of the formulae and analysis would remain the same. For example, above formulations related to WG lag also apply with VNT, as the control signal for VNT will affect boost pressure with a degree of lag.

In operation, the ECU or other controller may be operable to issue command signals to control the VNT to minimize the distance between the target boost pressure and an actual boost pressure, while preventing turbocharger speed from exceeding a predefined maximum speed. Such steps may include, for example, issuing a command to open the VNT either to prevent turbocharger overspeed or to prevent actual boost pressure from exceeding target boost pressure. In other conditions, the ECU or other controller may issue a command to close the VNT to raise the actual boost pressure when below the target boost pressure.

Each of these non-limiting examples can stand on its own, or can be combined in various permutations or combinations with one or more of the other examples. The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls. In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects. Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like.

Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. An engine system comprising:
an engine having an intake manifold and an exhaust manifold;
a turbocharger having a compressor and a turbine, the compressor being upstream of the intake manifold, the turbine being downstream of the exhaust manifold, wherein the turbocharger is configured obtain power from airflow exiting the exhaust manifold to drive the compressor to compress air to be provided to the intake manifold;
a wastegate positioned and configured to allow airflow exiting the exhaust manifold to bypass the turbine, the wastegate selectively controllable in a range of opening positions between open and closed;
a plurality of engine airpath sensors associated with the engine; and
a controller configured to perform the following:
estimate turbocharger speed using the engine airpath sensors and a model of the engine air path as a function of measured or estimated boost pressure downstream of the compressor, measured or estimated mass flow into the compressor, measured or estimated compressor inlet temperature, and measured or estimated compressor inlet pressure;
calculate a target turbocharger speed by reference to a target boost pressure; and
control the wastegate to minimize the distance between the target boost pressure and an actual boost pressure, while preventing turbocharger speed from exceeding a predefined maximum speed.

2. The engine system of claim 1 wherein the engine airpath sensors comprise:
a boost pressure sensor configured and positioned to measure the actual boost pressure to provide the measured boost pressure downstream of the compressor; and
wherein the controller is configured such that the engine airpath sensors used to estimate turbocharger speed include the boost pressure sensor.

3. The engine system of claim 1 wherein the controller is further configured to predict future turbocharger speed and calculate commands to the wastegate to avoid overspeed of the turbocharger.

4. The engine system of claim 1 wherein the controller is further configured to estimate turbocharger speed using a compressor model, predict future turbocharger speed and calculate commands to the wastegate to minimize a future difference between actual boost pressure and target boost pressure while avoiding overspeed of the turbocharger.

5. The engine system of claim 1 wherein the controller is configured to estimate turbocharger speed using a compressor model, a measured actual boost pressure, and each of an estimated compressor mass flow, estimated compressor inlet pressure and estimated compressor inlet temperature.

6. The engine system of claim 1 wherein the controller is configured to perform the step of controlling the wastegate to minimize the distance between the target boost pressure and an actual boost pressure, while preventing turbocharger speed from exceeding a predefined maximum speed, by:
calculating a current compressor power;
determining a target acceleration power needed to achieve the target turbocharger speed relative to the estimated turbocharger speed;
determining a turbine power needed to achieve the target acceleration power using the current compressor power; and
determining a wastegate position needed to modify turbine flow to achieve the turbine power.

7. The engine system of claim 1 wherein the controller comprises an upper level controller configured to predict future turbocharger speed within a time horizon, and to calculate feasible future turbocharger energy targets that prevent turbocharger speed exceeding a maximum speed limit, and a low level controller configured to control wastegate position in accordance with turbocharger energy targets computed by the upper level controller.

8. An engine system comprising:
an engine having an intake manifold and an exhaust manifold;
a turbocharger having a compressor and a turbine, the compressor being upstream of the intake manifold, the turbine being downstream of the exhaust manifold, wherein the turbocharger is configured obtain power from airflow exiting the exhaust manifold to drive the compressor to compress air to be provided to the intake manifold, the turbine taking the form of a variable nozzle turbine (VNT) selectively controllable in a range of opening positions between open and closed;
a plurality of engine airpath sensors associated with the engine; and
a controller configured to perform the following:
estimate turbocharger speed using the engine airpath sensors and a model of the engine air path as a function of measured or estimated boost pressure downstream of the compressor, measured or estimated mass flow into the compressor, measured or estimated compressor inlet temperature, and measured or estimated compressor inlet pressure;

calculate a target turbocharger speed by reference to a target boost pressure; and control the VNT to minimize the distance between the target boost pressure and an actual boost pressure, while preventing turbocharger speed from exceeding a predefined maximum speed.

9. The engine system of claim 8 wherein the engine airpath sensors comprise:

a boost pressure sensor configured and positioned to measure the actual boost pressure to provide the measured boost pressure downstream of the compressor; and wherein the controller is configured such that the engine airpath sensors used to estimate turbocharger speed include the boost pressure sensor.

10. The engine system of claim 8 wherein the controller is further configured to predict future turbocharger speed and calculate commands to the VNT to avoid overspeed of the turbocharger.

11. The engine system of claim 8 wherein the controller is further configured to estimate turbocharger speed using a compressor model, predict future turbocharger speed and calculate commands to the VNT to minimize a future difference between actual boost pressure and target boost pressure while avoiding overspeed of the turbocharger.

12. The engine system of claim 8 wherein the controller is configured to estimate turbocharger speed using a compressor model, a measured actual boost pressure, and each of an estimated compressor mass flow, estimated compressor inlet pressure and estimated compressor inlet temperature.

13. The engine system of claim 8 wherein the controller is configured to perform the step of controlling the VNT to minimize the distance between the target boost pressure and an actual boost pressure, while preventing turbocharger speed from exceeding a predefined maximum speed by:

calculating a target turbocharger speed using the target boost pressure;

calculating current compressor power;

determining a target acceleration power needed to achieve the target turbocharger speed relative to the estimated turbocharger speed;

determining turbine power needed to achieve the target acceleration power using the calculated current compressor power; and determining a VNT position needed to achieve the turbine power.

14. The engine system of claim 8 wherein the controller comprises an upper level controller configured to predict future turbocharger speed within a time horizon, and to calculate feasible future turbocharger energy targets that prevent turbocharger speed exceeding a maximum speed limit, and a low level controller configured to control VNT position in accordance with turbocharger energy targets computed by the upper level controller.

15. A method of controlling a turbocharger in an engine system that includes:

an engine having an intake manifold and an exhaust manifold;

a turbocharger having a compressor and a turbine, the compressor being upstream of the intake manifold, the turbine being downstream of the exhaust manifold, wherein the turbocharger is configured obtain power from airflow exiting the exhaust manifold to drive the compressor to compress air to be provided to the intake manifold;

a wastegate positioned and configured to allow airflow exiting the exhaust manifold to bypass the turbine, the wastegate selectively controllable in a range of opening positions between open and closed;

a plurality of engine airpath sensors associated with the engine;

a controller configured to obtain signals from the engine airpath sensors and control at least the wastegate, the method comprising:

the controller estimating turbocharger speed using the engine airpath sensors and a model of the engine air path as a function of measured or estimated boost pressure downstream of the compressor, measured or estimated mass flow into the compressor, measured or estimated compressor inlet temperature, and measured or estimated compressor inlet pressure;

the controller calculating a target turbocharger speed by reference to a target boost pressure; and the controller issuing command signals to control the wastegate to minimize the distance between the target boost pressure and an actual boost pressure, while preventing turbocharger speed from exceeding a predefined maximum speed.

16. The method of claim 15 wherein the engine airpath sensors comprise:

a boost pressure sensor configured and positioned to measure the actual boost pressure and provide the measured boost pressure downstream of the compressor; and wherein the step of estimating turbocharger speed includes taking sensor readings from the boost pressure sensor.

17. The method of claim 15 further comprising:

the controller predicting future turbocharger speed; and the controller calculating commands to the wastegate to avoid overspeed of the turbocharger.

18. The method of claim 15, further comprising:

the controller predicting future turbocharger speed; and the controller calculating commands to the wastegate to minimize a future difference between actual boost pressure and target boost pressure while avoiding overspeed of the turbocharger.

19. The method of claim 15 wherein the step of issuing command signals to control the wastegate to minimize the distance between the target boost pressure and an actual boost pressure, while preventing turbocharger speed from exceeding a predefined maximum speed comprises:

determining a target acceleration power needed to achieve the target turbocharger speed relative to the estimated turbocharger speed;

determining a turbine power needed to achieve the target acceleration power; and determining a wastegate position needed to achieve the determined turbine power.

20. The method of claim 15 wherein the step of the controller issuing command signals to control the wastegate to minimize the distance between the target boost pressure and an actual boost pressure, while preventing turbocharger speed from exceeding a predefined maximum speed, comprises issuing a command to open the wastegate either to prevent turbocharger overspeed or to prevent actual boost pressure from exceeding target boost pressure, or issuing a command to close the wastegate to raise the actual boost pressure when below the target boost pressure.

\* \* \* \* \*